Aug. 18, 1970   F. O. OLSEN   3,524,789
LOUVERED TRANSPARENT SHEETING MADE BY SKIVING
Filed Aug. 15, 1967
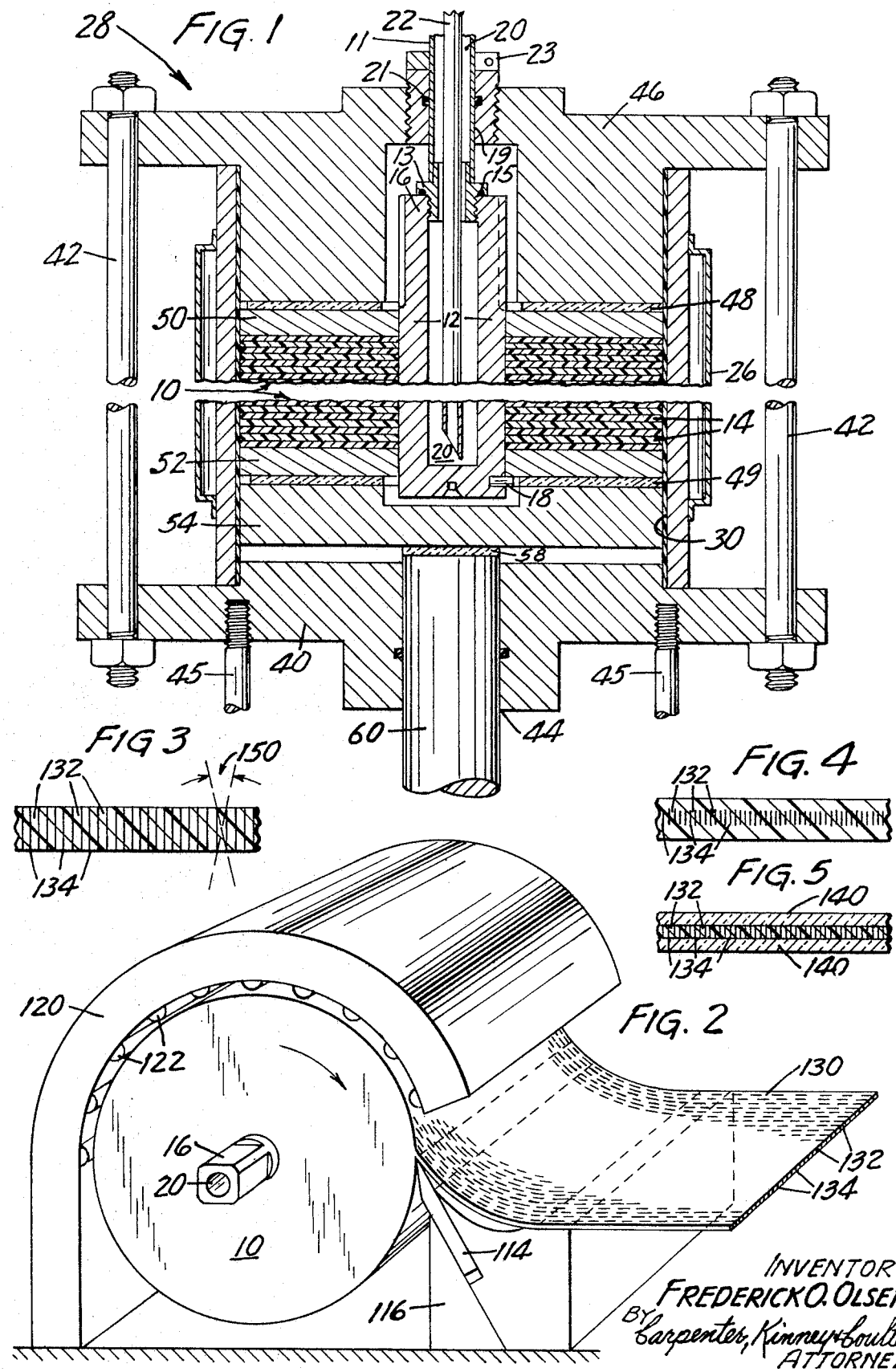
INVENTOR
FREDERICK O. OLSEN
BY Carpenter, Kinney & Coulter
ATTORNEYS United States Patent Office 3,524,789
Patented Aug. 18, 1970

3,524,789
LOUVERED TRANSPARENT SHEETING MADE BY SKIVING
Frederick O. Olsen, Oakdale Heights, Minn., assignor to Minnesota Mining and Manufacturing Company, St. Paul, Minn., a corporation of Delaware
Filed Aug. 15, 1967, Ser. No. 660,754
Int. Cl. B44f 1/00; B32b 31/00
U.S. Cl. 161—6                                10 Claims

ABSTRACT OF THE DISCLOSURE

Skiving of a laminated billet having opaque layers while heating the surface provides a web with longitudinal louver-like elements. The surface is polished.

---

This invention relates to and has as its object a process for the production of web materials for use in achieving optical effects and particularly for uses where limited angles of visibility are sought so that there is a restricted optical aperture and the products of the process. Examples of uses for such web material are in television screens, traffic signals, prevention of reflection and glare from instrument panels, one way glass and other such uses.

This invention is embodied both in processes for production of such webs and in the products of the processes displaying the desired properties in extremely long webs as compared to previously described products. The invention includes several steps of the processes.

The prior art has contemplated the production of sheets of plastic made by slicing blocks of alternating transparent and opaque sheets cemented together, for example, U.S. Pats. 2,053,173, 2,689,387, and 3,031,351. It is not known that such products have been introduced into commerce presumably because of the very considerable difficulty of cutting polymeric materials in the manners contemplated in the prior art.

An alternative method for the cutting of one polymeric material, polytetrafluoroethylene, has been borrowed from the veneer and leather working industries namely skiving. Illustrative of the application of this is the disclosure of U.S. Pat. 2,642,625 for polytetrafluoroethylene, of 2,245,170 for wood, and 2,827,403 for leather. It will be recognized that the inherent properties of polytetrafluoroethylene are so unusual that it occupies an almost unique position among polymers and it and processes using it cannot be equated to other polymers or processes using them. For example, in its inability to wet or to be wet by most materials, which prevents its sticking to a skiving knife, it must resemble materials such as wood or leather which do not adhere to metal spontaneously.

It is surprising to find that the process of skiving can be adapted to the cutting of webs of polymers which can adhere to metals provided certain modifications are made. Although the process is probably generally adaptable to thermoplasts, it is particularly useful for the production of webs of thermoplastic polymers having structures not readily produced by extrusion or casting processes.

Such a structure is one in which relatively wide clear strips and relatively narrow opaque strips alternate across the face of the web and extend therethrough so that there is restricted optical aperture. Although panels of such material of a few square centimeters may have been produced before, webs of substantial widths, say 50 cm. or more, and lengths of 10 or more meters are believed entirely new.

These webs are more or less readily wound up into supply rolls from which desired pieces may be cut. The ease of winding will depend on thickness, stiffness and other characteristics of the sheet as skived. Because of the much greater size than heretofore available novel utilities can be realized in which relatively large expanses are covered. For example, vision can be provided in a large window without permitting the nearly overhead sun to shine in. Such a shading effect can be especially useful in low latitudes where the sun always passes almost overhead. The effect is thus of having very narrow Venetian blinds built into the window.

It is a peculiar feature of webs produced by skiving that, as formed, one surface will necessarily be linearly shorter than the other although subtending the same arc. If cooled immediately after skiving plastic memory retains this difference as a curvature and straightening the web longitudinally transforms the difference to a transverse curvature.

It has been found that the skiving of thermoplastic materials is best performed using a billet having a rigid shaft with the polymer molded therearound and heating the surface of the billet immediately before contact with the skiving knife to a temperature sufficient to permit softening of the polymer at least to the depth contacting the skiving knife. Methods of heating will be discussed herein elsewhere. A steel shaft with one end shaped to be gripped by a chuck is particularly appropriate for the billet. Differential shrinkage of polymer around the shaft can be enhanced by conventional means.

For the production of a polymeric web with restricted optical aperture, a billet is formed around a shaft as described above. Discs with center holes larger than the shaft by from about 0.1 to about 0.5 mm. are cut from a primary laminate of clear and contrasting polymeric material and are then molded around the shaft. Many thermoplasts include small amounts of volatile materials such as moisture and the discs are then advantageously dried thoroughly before subsequent use to make a billet.

The primary laminate may be produced by any convenient means or, less conveniently, discs of clear and contrasting material can be used alternately. In the latter instance there is, however, more apportunity to obtain a disturbed sequence, for example, of several clear discs superposed. Conveniently the primary laminate is prepared from an extruded film of thermoplast of one type by coating with a layer of contrasting type either by extrusion or other convenient process, e.g., rotogravure or other method of printing, vapor coating, etc.

It will be recognized that the contrasting layer may be polymer which has been colored by dissolved dyestuffs or by pigments. For illustrative purposes reference will usually be to a pigmented layer, for example, including 3% by weight of carbon black as the pigment, but it is within the scope of the invention to include a bicolored contrasting layer in which the side next to the clear layer is one color and the outer layer is a different color or the clear polymer may be coated on opposite surface with different color. For example, one could produce a web which in addition to the restricted optical aperture from in front would appear green from one side and red from the other side.

By whatever method selected, clear and pigmented layers are provided and the discs are placed on a shaft using suitable retaining means. The inclusion of extraneous bits and pieces either of foreign materials or of the material of the laminae is avoided. The assemblage of discs is built up, until the pile slightly exceeds the desired width of the web. The entire assemblage is then placed in a chamber of just slightly greater (by an amount sufficient to compensate for thermal effects) diameter for gradual warming and application of pressure until the billet is fully consolidated and molded around the shaft and to the diameter of the chamber. Vacuum may be applied simultaneously. The method of heating and the temperature necessary will depend on the particular thermoplast used. A steam jacket is convenient because after complete consolidation, cooling water can be introduced into the jacket and the billet cooled rapidly. Normally the billet will be ready for skiving immediately after cooling.

When the thermoplast is quite flaccid, polyvinylbutyral being exemplary, it may be difficult to skive. Such a situation is handled by chilling the billet to a temperature at which the polymer is sufficiently rigid, e.g., using solid carbon dioxide, etc.

The invention is now further explained by reference to the drawings attached hereto, wherein:

FIG. 1 shows in somewhat diagrammatic cross-sectional view the shaping of a billet.

FIG. 2 is a perspective view of billet, skiving knife assembly, heating lamp and web in the relationships which they occupy on the bed of a conventional large metal working lathe.

FIGS. 3, 4 and 5 show cross-sections of webs in which there is respectively no added cover, transparent coverings on both sides of the same thermoplast and with glass attached to each face of the web.

Referring to FIG. 1, which is somewhat diagrammatic and not to scale, there is shown the manner in which a billet 10 is formed on shaft 12 from disks 14 having the opaque surfaces (represented by the lines) alternating with clear portions. One end of the shaft 16 is squared to permit grasping in the chuck of a lathe (not shown) and is provided with central hole 20 for the admission of steam or cooling water. Holt 20 is threaded for attachment of an assembly permitting placement of shaft 16 with relationship to disks 14 during the molding operation. Tube 11, attached to adapter 13 which fits hole 20 and retains O-ring 15, passes through upper retaining plate 46 by sliding seal 19 and O-ring 21 and is held in place against gravity by retaining clamp 23 which is split on one side and is tightened by a screw to prevent shaft 16 from bottoming in the well of ram plate 54.

In the molding operation an outlet 22 is provided for the escape of steam from hole 20 in shaft 16 and through upper retaining plate 46. Heat is provided externally to billet mold 28 during the molding operation by steam jacket 26 (having inlet and outlet not shown). Billet mold 28 has polytetrafluoroethylene liner 30. Tie rods 42 and upper retaining plate 46 secure billet mold 28 on stand 40 which latter is attached by tie rods 45 to the base of pressure means (not shown) having piston 60. The stack of disks 14 is separated from upper retaining plate 46 by insulation 48 and upper pressure plate 50. Pressure is exerted from below by lower pressure plate 52 separated by further insulation 49 from ram plate 54 which is also separated from piston 60, acting through opening 44 in stand 40, by insulating shim 58. The pressure plates fit tightly around shaft 16 and lower pressure plate 52 is prevented from slipping from the lower end of shaft 16 by retaining pin 18. Gas tight means (not shown) may be provided as part of stand 40 around piston 60. Ports may be provided through upper retaining plate 46 and in the lower wall of billet mold 28 so that vacuum can be applied and retained during the molding of a billet if desired.

It will be seen that, at temperatures at which the polymer of discs 14 becomes thermoplastic, force applied from piston 60 will consolidate disks 14 into a billet around shaft 12. The lining of cylinder 28 is not wet by the thermoplastic polymer and withdrawal of the billet from the cylinder is thus possible after cooling as a result of the differential shrinkage of the polymer.

Referring to FIG. 2, the billet, 10, prepared as described above is seen to have a central shaft 12 (with squared end and central hole as above described) rotating in a clockwise direction (arrow) because engaged in the chuck of a driving lathe of suitable design (not shown). The far end of the shaft bears against the tailstock of the lathe (not shown). Skiving knife, 114, rigidly attached in support, 116, to the cross-feed mechanism of the lathe is advanced horizontally toward shaft 12 by the cross-feed mechanism at a constant rate such that after contacting the billet surface the knife will cut a web of the desired thickness. As the web is formed it is wound up into a roll (not shown). The edge of knife 114 must be parallel to and in the same horizontal plane as the axis of billet 10.

The significant feature of this equipment is heater shell 120 which extends over billet 10 both lengthwise and for about ¼ to ½ the circumference. Heater shell 120 provides means for heating the skin of billet 10, for example, to a temperature in the range of 250° to 350° F. (120° to 180° C.) for cellulose acetate butyrate, so that steady even skiving becomes readily possible without enormous expenditure of power and/or production of gross irregularities. The heating means is controllable to provide more or less heat as needed for a particular polymer or for a particular depth of cut. It may be adjusted manually or automatically during the course of skiving to counteract too high or too low temperatures. Too high temperatures may result, for example, in excessive necking or constriction of the web immediately after skiving and before it is cooled or taken up on a supply roll. One the other hand, too low temperatures may result in knife chatter and irregular cutting as well as the necessity for extreme power and probably more rapid dulling of the knife.

The heating means shown comprises a bank of individually controllable heating lamps, 122, such as General Electric Heat Lamps No. 3M/T3/CL/1, or 3M/T3/CL/2, each capable of radiating 1200 watts per lineal foot. Other means may be employed if more convenient. The panel is spaced away from the billet slightly and the distance increases as the skiving progresses. This generally creates no problem as the heat flux is normally more than sufficient to effect the desired degree of skin softening of the billet. The panel extends beyond the ends of the billet. There is some tendency for overheating the ends and the center of the billet. This is counteracted by application of less heat absorbent coatings to the end of the billet, e.g., light color or metallized coating and further by providing flat reflectors parallel to the ends of the billet so that radiant heat passing the ends is returned. The overall effect of these measures is to equalize the temperature lengthwise of the billet and give more uniform heating and hence improved webs. Other means for heating may be used alternatively. It will be recognized that normal ventilation measures will be necessary in multiple and large scale operations to remove any fumes.

Although knife 114 and its support 116 are mounted so as to advance toward shaft 112, heating panel 120 is initially positioned with relation to the billet and not moved.

Web 130, is formed from the skiving operation and is seen to be composed of alternating clear, 132, and opaque, 134, strips. The web is taken up by any suitable means which preferably is of a type which merely prevents accumulation of slack in the web without placing more than slight tension on the web. It may be desirable to introduce chilling or polishing rolls or to have a take-up reel provided so that a lining sheet is taken up at the same time to prevent a still relatively hot and soft web from adhering to itself.

It is contemplated that control of variables may be manual or by suitable automatic devices.

When web, 130, is formed as described from a billet of thin black and relatively thick clear layers, the cross-section of a small portion of the width is essentially as illustrated in FIG. 2 in which the clear portions 132 are separated from one another by the black portions 134. The optical aperture is illustrated by the angle 150 included between the broken construction lines. It will be evident that this can be readily controlled by altering either the clear portions, 132, or by changing the thickness of skiving. Inclination of the opaque portions also affects the optical aperture and angle for transparency. Accordingly, by proper programming of a skiving machine, i.e. a heavy duty lathe, it would be possible to produce webs having changing numerical aperture. For example, sensing means immediately above the line of cutting could control and vary the depth of cut as desired.

The web as produced possesses some utilities depending on the particular thermoplast employed and upon the fact that cutting with a knife cannot give a completely clear surface. In addition to longitudinal lines due to slight irregularities in the knife edge there are greater or less transverse irregularities due to the lack of complete smoothness in cutting by the knife possibly arising from the operation of the machinery. Both types of irregularities presumably have always existed in previously skived materials such as veneer and leather and in sliced plastic materials but have been overlooked as of no consequence for the contemplated uses or were accidentally relieved.

A positive effort at removal of surface imperfections is highly desirable for most purposes and necessary where best optical effects are desired. When the web or portions thereof are cemented between two sheets of glass 140 a cross-sectional structure is as shown in FIG. 5. This may be a safety glass with polyvinylbutyral as the thermoplast of the web. Another method of smoothing surfaces is to coat the web on each side with a layer of the same clear thermoplast so that a small piece in cross-section will be as illustrated in FIG. 4.

Yet another method of providing clarity is to polish the surfaces by heating to the softening point in contact with a highly polished non-adhering surface such as a polyester film which is stripped away after cooling.

As a more specific illustration of the best mode contemplated for practicing the invention, a detailed description is provided of the preparation of a louvered web in which cellulose acetate butyrate is employed as the thermoplast.

The primary laminate is made by first extruding a film of the butyrate into which 3% by weight of carbon black has been milled in a Banbury mixer or other such mill. This initial film, approximately 0.0015 inch (or 0.004 mm.) thick, is then coated by extrusion with a layer of clear butyrate about 0.01 inch (0.25 mm.) thick.

Molding of the billet is carried out using a containing cylinder lined with polytetrafluoroethylene having internal diameter of 10.058 inches (255.47 mm.) on a shaft with external diameter 2.500 inches (63.50 mm.). Disks are stamped from the primary laminate so as to have clearances of about 0.02 inch (0.51 mm.) externally and 0.006 inch (0.15 mm.) at the center, i.e. disks about 10.038 inches (254.96 mm.) outside diameter with 2.506 inches (63.65 mm.) central opening. Punching may be performed of one or several disks at a time, usually three. It is important that there be sufficient clearance so that there is no tendency to hang-up externally or internally during compression which results in introducing slightly irregular canting of laminae. Canting due to excessive thermal expansion of laminae is corrected by using laminae having larger central holes and smaller outer diameters. Waste from the punching operation may be reprocessed by addition of suitable amounts of carbon black to give new black film.

After a sufficient supply of disks has been punched, they are heated in stacks of about 80 to 200 in an oven under forced draft for four or more hours at about 65° C. (150° F.) in order to expel moisture and other volatile materials and so that the slight curvature, induced by storage of the primary laminate in rolls, is removed.

The shaft (36 inches or 92 cm. long) is hollow. It may also be so that steam or cooling water can be introduced as shown in FIG. 1. The shaft is secured in a vertical position with the lower plates in place. Disks still hot from the drying oven are placed on the shaft imparting a spinning motion manually or by an air stream sufficient to throw out extraneous matter and particularly the center punch-outs. The disks are worked as low as possible on the shaft. This operation also randomizes inherent unevenness in the discs, for example, a stripe of greater or lesser thickness running lengthwise of the rolls of primary laminate. In the apparatus of FIG. 1, the weight of disks 14 and upper retaining plate 46 particularly is permitted to provide initial compaction of the disks by action against lower pressure plate 52 and retaining pin 18. This raises shaft 16 as high as possible through the stack of disks and it is held in that position by tightening retaining clamp 23.

The billet mold, as noted, is cylindrical and lined with polytetrafluoroethylene. It is provided at the ends with means which minimize application of pressure to the shaft and aluminum disks thermally insulated from the recessed caps by which pressure is transmitted to the billet. If desired the mold may be sealed and evacuated to a pressure of about 10 mm. of Hg throughout the molding cycle. Pressure of about 30 pounds per square inch is applied mechanically (hydraulic press) to the stack of disks at a temperature of about 50° C. (residual temperature of the disks after drying) and this pressure is maintained throughout the following operation and until the molded billet has finally cooled enough to be removed from the mold. Concomitant with the application of hydraulic pressure steam at about 95° C. is introduced into the heating jacket and the shaft and the temperature of this steam is maintained for 6 hours and then the temperature is raised to 140° C. for a further 6 hours until the laminae have fused to one another. Heating is discontinued and the billet is permitted to cool, with application of hydraulic pressure, for 16 hours at which time the temperature is about 35–40° C. The billet has shrunk away from the polytetrafluoroethylene lining and is removed. Provision for external cooling is also feasible and shortens the cooling time. The billet is molded around the shaft and is ready to be skived.

The billet is mounted in a powerful lathe having sufficient clearance to handle a workpiece of this size with one end in the chuck and the other rotatably supported at the tailpiece. The skiving knife assembly is essentially a steel block about 20 cm. square by 80 cm. long with one side recessed to receive the special knife and in which the knife is securely fastened. This assembly is mounted on the bed of the lathe and aligned so that the knife is parallel to the axis of the lathe. The upper edge of the knife makes an angle of 20° with horizontal and the forward face slopes back by 8° from vertical. Variations in these angles from 0° up to at least 50% higher figures are fully permissible. The point of the blade is thus approximately 50° to 90°. More acute angles than 45° may be somewhat more easily damaged. The heating panel of eight 3 kva. heating tubes 85 cm. long and wired to be controlled separately is brought over the billet and about 3 to 7 cm. away from it initially. A take-up reel with a constant torque drive is provided that is essentially parallel to the axis of the lathe.

The lathe is started at 12 r.p.m. and cross-feed for the knife-blade is set to advance about 0.044 inch (1.1 mm.) per revolution but not started. About half the bank of heating lamps are turned on and the temperature of the surface of the billet is followed by use of commercially available crayons that show temperatures by melting or failing to melt. Heating is continued without advancing the knife-blade until the crayons show a temperature from 300° to 320° F. (150° to 160° C.) on the surface of the billet. This temperature is maintained by increasing or decreasing the amount of heat as needed and the cross-feed for the knife-blade is engaged. Cutting starts by removal of high spots followed very rapidly by removal of web to the full width of the billet. The end is quickly brought to the take-up reel and attached. Skiving continues, assuming proper mechanical function, until the cross-feed is disengaged before the knife-blade comes so close to the metallic shaft as to be possibly damaged. Necessary adjustments in heating are made during the cutting if it appears that the temperature of the billet is too high or too low. Too low temperatures leading to a rough surface are the source of trouble when very thick webs are made, for example, above about 1 to 2 mm. Cuts less than about 0.05 mm. are so thin as to be of little interest for narrowing of optical aperture although potentially useful in some other fields.

Slight irregularities in the knife-blade produce parallel longitudinal scoring of the skived film and together with other surface imperfections make the skived film translucent rather than transparent. In addition there is a very slight curvature in the web resulting from the skiving which cuts a slightly shorter linear distance on each succeeding helix cut from the billet. Although this curvature is produced in the length of the web, an attempt to remove it longitudinally produces stresses such that the curvature appears transverse of the web. In other words there is inherently a recognizable curvature to a skived web of polymer.

These surface effects are corrected by pressing between polished flat plates under about 3.5 atmospheres pressure and above about 130° C., the softening point of the polymer, and cooling in contact with the polished surface. Other methods of molding the smooth surface are also applicable and smooth clear sheets of the same polymer or of glass may be laminated to the surface thereby providing flat sheets having cross-sections as shown in FIGS. 4 and 5 respectively.

Essentially the same process is employed, making allowances for the differences in materials, to produce a web of polyvinylbutyral resin. Primary laminate and discs are prepared as above using lower temperatures for extrusion and laminating at about 200° F. (93° C.). The discs of polyvinylbutyral do not require drying. The billet is molded around the shaft by a similar procedure using somewhat lower operating temperatures.

Skiving of the polyvinylbutyral billet requires that the billet be prechilled to a temperature low enough that it is firm. Cooling in solid carbon dioxide for about 16 hours is fully satisfactory although such a low temperature is not imperative. Skiving is carried out as described above using a lower surface temperature of about 95–110° C. This web is laminated to glass surfaces by the procedures conventionally used in the manufacture of safety glasses from polyvinylbutyral film.

What is claimed is:

1. A process for the production of a web of substantially transparent plastic film material having optical aperture restricted in one linear direction and having relatively narrow opaque elements regularly spaced across and constituting not more than one-fourth the width of said web, comprising the steps of
    (I) providing an integral cylindrical billet of thermoplastic polymer having longitudinally regularly alternating relatively thick clear and relatively thin contrasting laminae unified by mechanical pressure at elevated temperature around a central shaft and
    (II) rotating said billet by means of said shaft therethrough while
        (A) advancing a knife parallel to said shaft against said billet throughout the length thereof at a rate maintained essentially constant with respect to the radial speed of said billet and
        (B) simultaneously heating the surface of said billet in advance of the line of contact with said knife to a temperature sufficient to soften the outer portion of said billet at least to the depth of the cut being made therein.

2. A process according to claim 1 wherein the thermoplastic polymer is cellulose acetate butyrate and the surface in advance of the knife is heated to about 150° to 160° C.

3. A process according to claim 1 wherein the thermoplastic polymer is polyvinylbutyral and the surface in advance of the knife is heated to about 95° to 100° C.

4. The product of the process of claim 1.

5. The product of the process of claim 2.

6. The product of the process of claim 3.

7. A web of substantially transparent plastic film material having restricted optical aperture according to claim 4 having surfaces freed at least from scoring to an extent sufficient to permit vision with no more than minor distortion through clear portions of said web.

8. A web according to claim 7 wherein the film material is cellulose acetate butyrate.

9. A web according to claim 7 wherein the film material is polyvinyl butyral.

10. The combination of a longitudinally laminated cylindrical billet of contrasting laminae of thermoplastic polymer and shaft centered therein adapted for skiving by the process of claim 1.

References Cited

UNITED STATES PATENTS

| | | | |
|---|---|---|---|
| 2,053,173 | 9/1936 | Astima | 161—3.5 |
| 2,158,086 | 5/1939 | Roberts et al. | 264—158 |
| 3,223,568 | 12/1965 | Alderfer | 156—255 |

FOREIGN PATENTS

| | | |
|---|---|---|
| 319,806 | 9/1929 | Great Britain. |

DOUGLAS J. DRUMMOND, Primary Examiner

R. A. KILLWORTH, Assistant Examiner

U.S. Cl. X.R.

83—15; 156—255; 264—1, 158